Oct. 20, 1953  W. G. MAURER ET AL  2,656,133
AUTOMATIC AIRSPEED CONTROL SYSTEM FOR AIRCRAFT
Filed May 26, 1950  3 Sheets-Sheet 1

Inventors
WINFIELD G. MAURER
DAVID V. M. GREEN

By
Schmitt
Walter S. Pawl
Attorney

Inventors
WINFIELD G. MAURER
DAVID V. M. GREEN

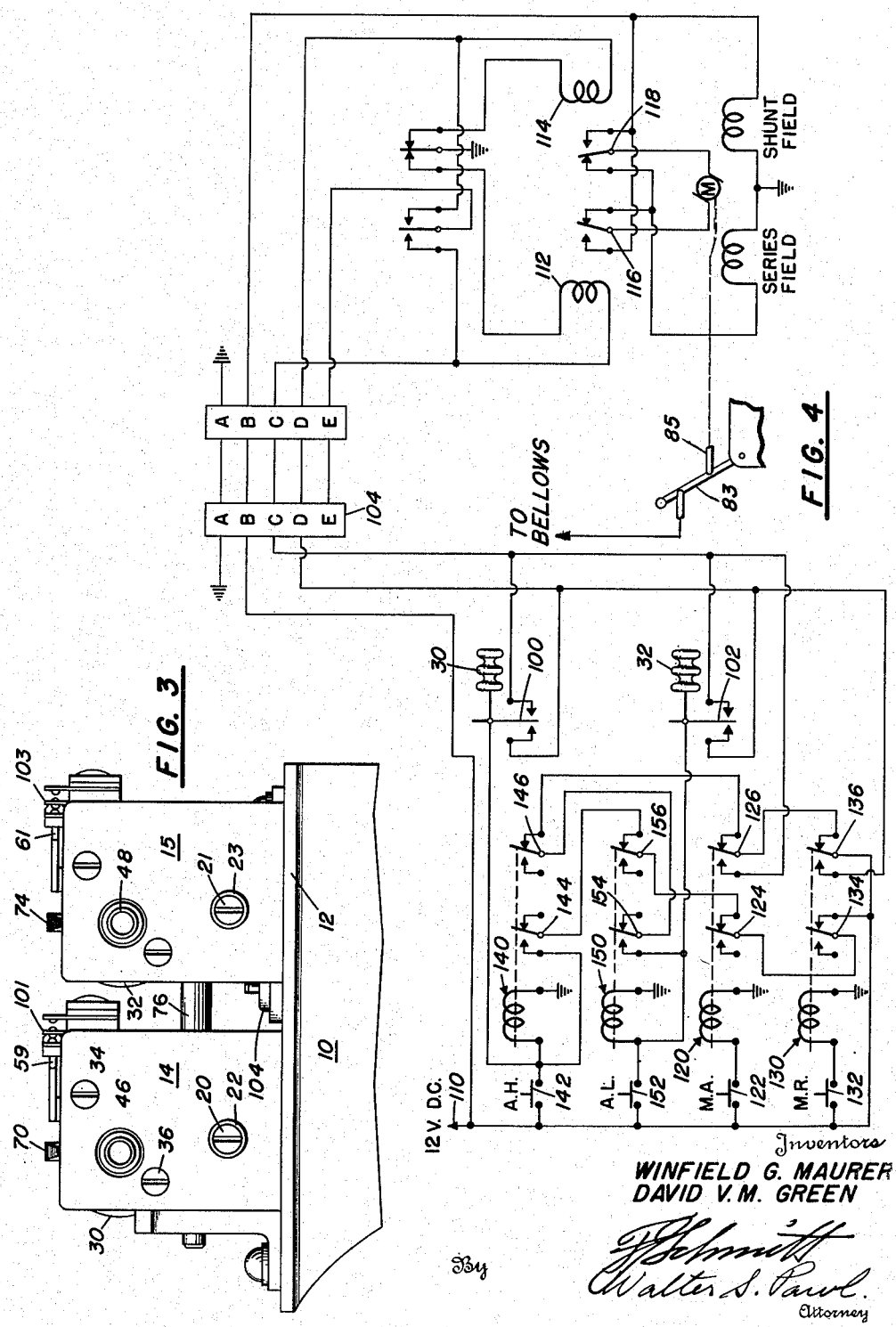

Patented Oct. 20, 1953

2,656,133

UNITED STATES PATENT OFFICE 2,656,133

AUTOMATIC AIRSPEED CONTROL SYSTEM
FOR AIRCRAFT

Winfield G. Maurer, United States Navy, and
David V. M. Green, Camden County, N. J.

Application May 26, 1950, Serial No. 164,582

4 Claims. (Cl. 244—77)

(Granted under Title 35, U. S. Code (1952),
sec. 266)

This invention relates to an automatic airspeed control system for aircraft and in particular to a pressure responsive type of controller and associated devices which are necessary for such an automatic airspeed control system.

The general object of the invention is to provide an airspeed controller adapted to traverse and position any aircraft's power control lever automatically.

It is also an object of the invention of provide such an airspeed controller which will maintain the aircraft's indicated airspeed within the selected one of several predetermined airspeed ranges.

It is a further object of the invention to provide an airspeed control system for aircraft which automatically prevents overspeeding of the engines (in propeller driven aircraft) during dives beyond limits for airspeed control, through power setting variations.

It is an additional object of the invention to provide an automatic airspeed control system which facilitates the landing of the aircraft by maintaining a minimum safe airspeed despite gusts of wind and pitch attitude changes.

It is also an object of the invention to provide an automatic airspeed control system which facilitates simultaneous remote control of a plurality of aircraft by maintaining them at substantially uniform cruising airspeed.

It is an additional object of the invention to provide an automatic airspeed controller which facilitates remote control during diving maneuvers by insuring against overspeeding in the dive and stalling of the aircraft in subsequent pull-out.

It is a further objective of the invention to provide an automatic airspeed controller which facilitates remote control of radio controlled aircraft under "out of sight" conditions, as in emergency interceptions and in unescorted ferry flights over long distances.

Other objectives will be apparent from the following description and from the drawings hereto attached which are merely illustrative of preferred embodiments of the invention and are not limitative thereto beyond the definition of the herewith appended claims.

In the drawings:

Figure 3 is an end elevation, partly broken away showing the relationship of the high and low speed bellows to each other.

Figure 4 is a wiring diagram showing the relay switches operated by the bellows and the wiring diagram for controlling the electric current to the servo-motor control.

Figure 1:
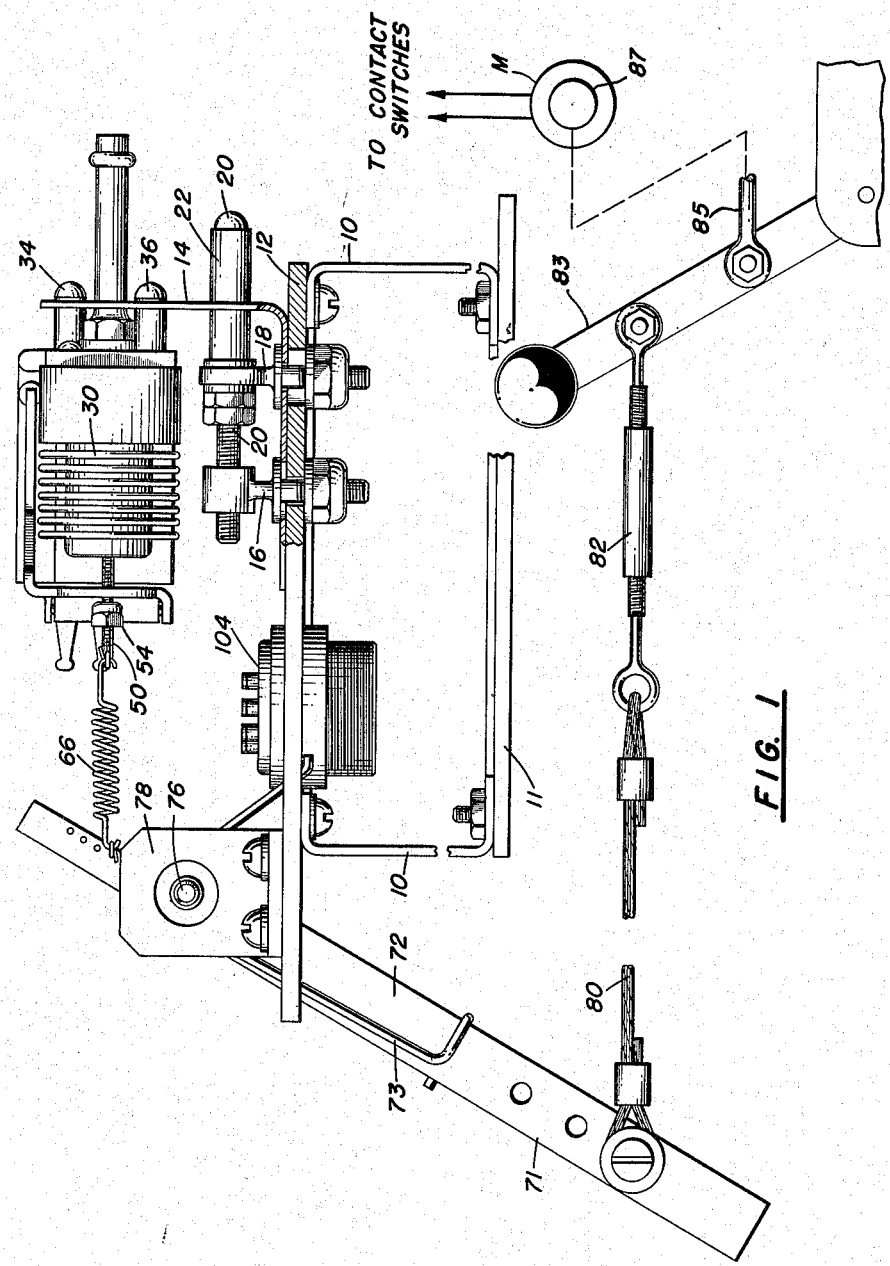
Figure 1 is a side elevation of the airspeed controller device showing the arrangement of the pressure responsive bellows on its supporting structure, the spring tensioning means, the speed adjustment screw device, the electrical distribution switch and the controlled servo-motor.
Figure 2:
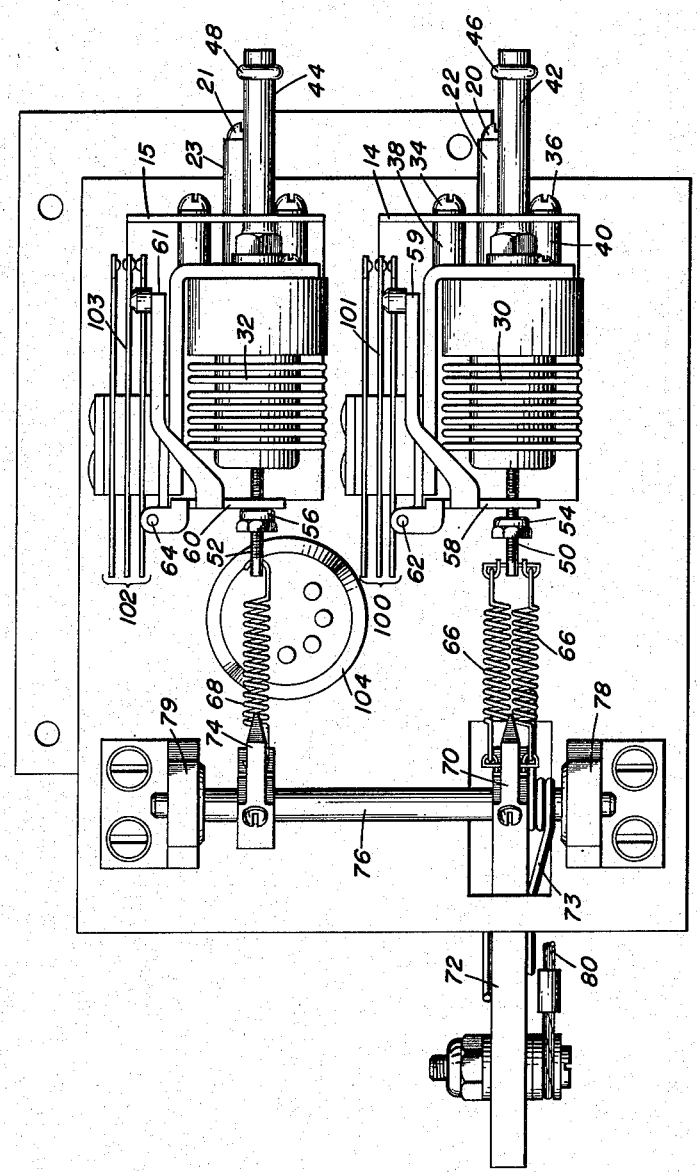
Figure 2 is a plan view thereof.

The attainment of the above objectives may be accomplished by apparatus illustrated in the drawings wherein at 10 is shown a box-like support structure. This structure is provided with a base plate 11 and top plate 12 and may be securely attached to cross-struts in the cockpit of an airplane below the instrument panel. On top plate 12 angle brackets 14 and 15 may be slidably attached as by threaded eye bolts 16 and 18. Screw bolts 20 and 21 are provided with bushings 22 and 23 which are slidable with respect to brackets 14 and 15. Screw bolts 20 and 21 threadedly engage the eyes of bolts 16 and 18. Bracket 14 and similarly bracket 15 is slotted with respect to bolt 16 and fixed with respect to bolt 18. Top plate 12 is slotted with respect to bolt 18 so that this bolt and brackets 14 and 15 may move with respect thereto. Rotation of screw bolts 20 and 21 will therefore cause brackets 14 and 15, respectively, to move to the right or left, as shown in Figures 1 and 2, depending upon the direction of rotation of these screw bolts. Securely attached to brackets 14 and 15 and movable therewith are bellows assemblies 30 and 32. These bellows assemblies may be attached to brackets 14 and 15 as by machine screws 34 and 36 which hold said assemblies in spaced relationship to said brackets by means of sleeves 38 and 40. Communicating with the interior of bellows 30 and 32 are tubes 42 and 44 which are provided with upset rings 46 and 48 which function to make a tight connection with a flexible hose connection. To the head end of bellows 30 and 32 are axially attached threaded stems 50 and 52, the threaded portions of which are engaged by nuts 54 and 56 which function, upon the inward movement of stems 50 and 52 to rotate bell cranks 58 and 60 about their respective pivots 62 and 64. The outer ends of stems 50 and 52 are connected to coiled springs 66 and 68. The other end of spring 66 may be connected to arm 70 of lever 72 which is securely mounted on rotatable shaft 76. The latter is journalled for rotation in bearings 78, 79. Spring 68 may be attached to arm 74 which is also securely mounted on shaft 76. Cable 80 may be attached at one end to the other arm 71 of lever 72. The other end of cable 80 may be attached by means of turnbuckle link 82 to the power lever or throttle 83 of the aircraft engines in such a manner that as the power lever advances (increasing the supply of fuel) the tension on springs 66 and 68 is decreased and vice versa. Thus, the tension exerted by springs 66 and 68 on stems 50 and 52 is set between upper and lower limits by the length of cable 80 as determined by turnbuckle link 82 and speed adjustment screws 20 and 21 and varied between these limits by the traverse of the power lever.

Tubes 42 and 44 which communicate with the interior of bellows 30 and 32, respectively, may be connected in parallel by flexible tubing to the throat of a Venturi tube (not shown) or to a Pitot tube as the case may be. When the apparatus is connected to a Pitot tube the sense of the throttle or power lever motion of arm 71 is opposite to that described for operation with the Venturi tube connections. With the apparatus shown in Figs. 1 to 3, a Venturi tube is used. This Venturi tube is positioned below the wing of the aircraft, whose airspeed is being controlled, so as to be clear of airflow interferences and propeller wash and in parallel alignment with the aircraft's longitudinal axis. The suction created by the flow of air through this venturi is proportional to the square root of the velocity of air passing therethrough and therefore proportional to the square root of the airspeed of the aircraft. As above indicated, this suction is transmitted to the interior of bellows 30 and 32 and tends to cause them to contract or collapse and to move stems 50 and 52 to the right as shown in Fig. 2. Nuts 54 and 56 are positioned on stems 50 and 52, respectively, nut 56 being in advance of nut 54. These nuts, upon the movement of stems 50 and 52 to the right as shown in Fig. 2, bear upon a leg of bellcranks 58 and 60 and cause them to rotate in a counterclockwise direction.

The other arms 59 and 61 of bellcranks 58 and 60 bear upon the middle leaves or moving contacts 101 and 103 of relay switches 100 and 102, respectively. Electric current is fed to moving contacts 101 and 103 through push button controls and thence through socket 104 to control the operation of the servo-motor as will be described hereinafter.

The Venturi tube, above defined, in the system of airspeed control forming the subject of this invention performs the velocity to pressure head conversion function. This system of this invention employs an electrically controlled servo which may be driven by electric, hydraulic or pneumatic motors. Future high sensitivity requirements or special application requirements may call for substitution of conventional magnetic, capacitative or photo-electric unbalance indication with associated vacuum tube amplifier relays or substitution of pneumatic or hydraulic indicator relays for the presently adequate, simple contact electrical switches defined and illustrated in the drawings herewith submitted.

The detailed sequence of operations in the airspeed control system, herein defined, is as follows:

(a) The kinetic potential of the relative airstream is converted by the Venturi tube (or Pitot tube if used) to a static differential unit pressure in accordance with the following equations:

$$h_1 = \frac{C_1 V^2}{2g}$$

for the Pitot tube and $$h_2 = \frac{C_2 V^2}{2g}$$

for the Venturi tube, where $h$ is the differential unit pressure head in inches of mercury, $g$ is the gravitational constant, V is the relative air velocity in feet per second, $C_1$ is a combined efficiency and unit conversion coefficient for the Pitot tube, while $C_2$ is a similar coefficient for the Venturi tube including the $$\left[\left(\frac{A_1}{A_2}\right)^2 - 1\right]$$

area ratio factor.

(b) The differential unit pressure head is transmitted through connecting tubing and is imposed upon the airspeed controller bellows to extend (or compress) said bellows when the product of this unit pressure head by the area of the bellows end exceeds (or becomes smaller than) the algebraic sum of the intrinsic and the extraneous spring load forces acting upon said bellows.

(c) With the extension (or compression) of the bellows upon unbalance, a single pole double throw leaf spring switch with open circuit neutral range is actuated. Over the bellows travel span of 0.020 inch, approximately, half is utilized for open-circuit neutral clearance condition, the remainder for contact wipe and spring compression in the closed circuit terminal conditions. The switch has electric circuit connections to control the traverse of the servo.

(d) As the servo advances, it relieves the force balancing spring, through a cable and lever system, to decrease the extraneous force exerting upon the controller bellows; conversely the extraneous force is increased as the servo returns. The switch contacts are connected to the servo electric circuit in the sense required to traverse the servo to increase the balancing spring tension as the differential unit pressure affecting the bellows decreases. Thus, the complete servo traverse corresponds to a range of differential unit pressure, hence a range of airspeed, whose numerical values are determined by the dimensions and preloading of the bellows and the force balancing spring.

(e) The airspeed controller servo is linked mechanically, by means of a clutch other overpower mechanism, to the aircraft's throttle or power control lever, completing a simple proportioning automatic control system.

(f) The airspeed range for full servo traverse, viz, the throttling range, a measure of the proportional setting, is selected by original empirical approximation modified by several experimental adjustments to approach the useful maximum controller sensitivity (minimum throttling range) which is to be found just short of (1) interference with airspeed-attitude self-stabilization of the aircraft in pitch (2) interference (in propeller driven aircraft) with the regulation of engine speed by the automatic propeller-pitch-adjusting governor and (3) continuous hunting (self-oscillation) of the (automatically) controlled system.

It is to be noted that the controller sensitivity limited by these three criteria will be considerably lower than levels characterized by propulsion engine surging, or by self-oscillation of the controller subsystem alone; yet it will be high enough to require a relatively lively servo, and careful design of the pneumatic controlling piping to the converting Pitot or Venturi tube to minimize its time constant.

It is to be noted that the airspeed unit pressure rate varies directly with the airspeed by reason of the square relation of the airspeed to the pressure schedule. It is significant that the airspeed controller system of this invention comprises a plurality of preset controller elements (while only two controller elements have been illustrated in the drawings, it is feasible to use several more if they are required), with parallel pneumatic and linkage connections to the initial and final elements of the system, which elements require only electrical switching to effect selection of the controlled aircraft's airspeed range, and the system requires no remote estimation and adjustment of the airspeed after the initial calibration.

The electrical circuit connections for this airspeed control system vary in detail with the general system of the remote control circuit used. For example, an initial simple circuit requires only a three-position selector switch (marked Auto-High, Auto-Low and Manual) to switch the actuating electric supply from the controller element calibrated for the high airspeed, in turn to that calibrated for the low airspeed thence to a momentary contact switch (single pole double-throw, designated Manual-Advance and Manual-Retard) for direct control. The electric supply (together with other energy supply, if any) to the electrically controlled servo is connected directly and continuously, while continuous direct and parallel connections are provided from the airspeed controller (high speed) increase contact, the airspeed controller (low speed) increase contact and the direct control increase key to the servo increase relay coil. In one preferred embodiment of the invention, the general system of the remote control electric circuit may comprise a "minor switch" (a telephone type of stepping switch) which performs the circuit selecting function, two lock-in load relays (one with a back contact release), two load relays with back contact releases in a series limit circuit, to provide for a selection among two ranges of automatic airspeed control and a direct throttle control (position) in accordance with sequential momentary contact pulses received from two single-pole double-throw switch keys by way of four remote control circuits. As shown in Fig. 4 of the drawings, the most general form of electrical circuit connection for the airspeed control system is therefore one requiring only the energizing of one circuit each for advancing the servo (Manual-Advance), returning the servo (Manual-Retard), energizing the low airspeed controller element (Auto, Low) and the high airspeed one (Auto, High); this requires two load relays with back contact releases in a series limit circuit for the two direct circuits, and two load and hold in relays with back contact releases in the series limit circuit for the two automatic circuits. As above indicated, more than two preset automatic airspeed controller elements may be used in one installation; correspondingly the electric circuit, above described, may be extended for selection among several preset controller elements.

With further reference to Fig. 4 of the drawings, the electric circuit therein shown in diagrammatic form functions as follows. Two branch circuits, C and D, are shown, the one operating to rotate servo-motor M in right rotation to advance the power throttle 83 and the other operating servo-motor M in left rotation to retard the power throttle. Current from a 12 volt D. C. power source is fed through circuit B to the shunt field of motor M and thence to the ground. When relay 112 is energized, armature 116 makes a contact opposite to that shown in the drawing. Current from circuit B then passes through armature 116 to the armature of motor M thence through armature 118 to the series field of the motor M to the ground. Flow of current in this circuit rotates motor M to the right and advances the power throttle through connecting mechanism including link 85 and appropriate gearing as indicated by gear box 87. When relay 114 is energized, armature 118 makes a contact opposite that shown in the drawing and current from circuit B flows through the armature of motor M in a direction opposite to that when relay 112 is energized, the motor rotates to the left and the power throttle is retarded.

Four relay actuated controls are shown in the diagram. These are the Manual-Advance relay 120, the Maunal-Retard relay 130, the Automatic-High hold in relay 140 and the Automatic Low hold in relay 150. These relays are energized with the 12 volt D. C. current from source 110 through normally open push button switches 122, 132, 142 and 152, respectively. Only one relay control may be operated at a time. In general, simultaneous operation of relays 120 and 130 or 140 and 150 may feed current into both circuits C and D and prevent operation of motor M in either direction.

Assume that it is desired to fly the plane at an airspeed of 130 miles per hour. Bellows 30, by adjustment of screw 20 is positioned to interrupt the flow of current to circuit C at this airspeed. Push button 142 is closed momentarily and then released. This energizes the coil in hold-in relay 140 and moves the armatures 144 and 146 to make contacts with the other poles opposite to that shown in the drawing. Current then passes from the line through switches 134, 124, 156 to 144 and thence to the coil of hold in relay 140 to lock in armatures 144 and 146, and to the armature of switch 100 whence it is fed to circuit C to operate motor M to advance the power throttle. As the airspeed rises above 130 miles per hour, the armature 100 moves over from circuit C contact to circuit D contact thereby reversing motor M and retarding the power throttle to reduce the airspeed. This automatic high speed control will hold the airspeed to within the range of 130 miles per hour plus and minus approximately two miles per hour. The magnitude of this range on either side of the critical speed depends upon the size of the interpolar gap and the physical characteristics and adjustment of the bellows and tension springs.

If it is desired to operate the direct increase relay 120 to increase the air speed, manually operated push button switch 122 is closed and so held, because it is not a hold-in type, until the current fed to circuit C advances the power throttle to attain the desired speed.

In a like manner the air speed may be reduced by manually closing push button switch 132 and holding it closed until the reduced air speed is attained.

Operation of either one of the manually controlled relays cuts off the current supply to either one of the automatic controls. Also operation of the automatic low control cuts off the supply of current to the automatic high relay control, and vice versa.

Several test flights were made with a propeller driven airplane equipped with the airspeed control system herein disclosed. This control system includes a standard aircraft Venturi tube (Army Type A-3A, F. S. S. C. #88T-3570) mounted on the underside of the right wing of the aircraft in a position clear of interferences and propeller wash; tubing connecting the throat of the Venturi tube in parallel to the bellows tubes of a pair of controller elements (Naval Aircraft Factory #47615 Sylphon Relays, minimum operating differential unit pressure 0.10 inch of mercury); an electrically driven servo direct connected to the power throttle lever of the aircraft; electric circuit means connecting the relay switches of the controller elements to the control switch of the servo and a cable of predetermined length linking the power throttle to coiled springs in the controller elements in the sense that as the throttle advanced the tension on said springs decreased.

In these test flights the airspeed range was selected at eighty miles per hour for the low-speed control index setting and at one hundred and thirty miles per hour for the high-speed control index setting. The design characteristic of the Venturi tube was 6.85 inches of mercury vacuum at 225 miles per hour at sea level.

From the Venturi design specification and the conversion equation ($h=KV^2$), the unit pressure values for 80 and 130 miles per hour were computed; the pressure velocity rates were calculated for these values by differentiating the above equation with respect to the velocity—thus $$\frac{dh}{dV}=2KV$$

the conversion factor being known for the particular Venturi tube. Combining these data with estimated minimum airspeed differentals of three and six miles per hour tolerable for full throttle traverse at 80 miles per hour and 130 miles per hour, respectively, yielded the spring rates for the force-balancing springs of the controller elements.

Three test flights of approximately one hour duration each were required to complete the adjustment of the two airspeed indices and the two controller proportional ranges. It was found that the minimum airspeed of 80 miles per hour was too low for maneuverability. This minimum was increased to 90 miles per hour and this adjustment was made and tested. The final performance of the aircraft under the control of this airspeed control system was adjudged to be completely satisfactory. At indicated airspeed of 128 miles per hour, plus or minus three miles per hour was required for full throttle traverse, while at 90 miles per hour a differential of plus or minus two miles per hour was required; there was no continuous self-oscillation of the control system and no porpoising of the aircraft.

From the foregoing, it is apparent that the applicants have invented an airspeed control system comprised of a plurality of component parts which bear an operative relationship to each other. It is obvious to one skilled in the art that other parts can be substituted for the particular ones herein described and that they will function in a satisfactory manner if they have the same operative effect. The invention is, therefore, not limited to the particular components described, but includes the equivalent class of such components to the extent as defined by the herewith appended claims.

The invention herein described may be manufactured and used by or for the Government of the United States of America for governmental purposes without the payment of any royalties thereon or therefor.

What is claimed is:

1. An airspeed control system for aircraft, installed thereon for automatically maintaining the airspeed of the aircraft between maximum and minimum limits by positioning the power throttle thereof, comprising a throttle mounted on said aircraft for controlling the supply of power thereto, airflow means for converting the velocity of the airflow therethrough, produced by the speed of said aircraft, into a pressure head proportional to said speed, pressure responsive means including an expansible element in communication with the pressure head developed by said airflow means, a servo-motor operatively connected to said power throttle adapted by the direction of its movement to advance or return said throttle, servo-motor control means operated by said pressure responsive means including an inflexible limit adjusting device for determining the direction and limits of movement of said servo-motor, and means connected directly between said throttle and expansible element for reducing automatically the limits of movement of said servo-motor, as set by said servo-motor control means.

2. An airspeed control system for aircraft, installed thereon for automatically maintaining the airspeed of aircraft between maximum and minimum limits by positioning the power throttle thereof, comprising a throttle mounted on said aircraft for controlling the supply of power thereto, a Venturi tube installed on the aircraft in a position clear of propeller wash and airflow interference for converting the velocity of the airflow therethrough produced by the speed of said aircraft into a pressure head proportional to said velocity, pressure responsive means including an expansible element in tubular connection with the throat of said Venturi tube and thereby subject to the pressure head developed by said Venturi tube, a servo-motor operatively connected to said power throttle adapted by the direction of its movement to advance or return said throttle, servo-motor control means operated by said pressure responsive means including an inflexible limit adjusting device for determining the direction and limits of movement of said servo-motor, and means connected between said throttle and expansible element including a resilient element for reducing automatically the limits of movement of said servo-motor as set by said servo-motor control means.

3. An airspeed control system for aircraft installed thereon for automatically maintaining the airspeed of the aircraft between maximum and minimum limits by positioning the power throttle thereof comprising a throttle mounted on said aircraft for controlling the supply of power thereto, a Venturi tube installed on the aircraft in a position clear of propeller wash and airflow interference for converting the velocity of the airflow therethrough produced by the speed of said aircraft into a pressure head proportional to said velocity, at least one pressure responsive bellows in tubular connection with the throat of said Venturi tube and thereby subject to the pressure head developed by said Venturi tube, resilient means connected between said throttle and the movable structural head of said bellows for exerting a predetermined tension on said bellows head, a servo-motor operatively connected to said power throttle adapted by its direction of movement to advance or return said throttle and thereby modulate the force exerted on said bellows head by said pressure head, and servo-motor control means operated by said pressure responsive bellows for determining the direction and limiting the rotation of said servo-motor means.

4. An airspeed control system for aircraft, installed thereon for automatically maintaining the airspeed of the aircraft between maximum and minimum limits by positioning the power throttle thereof, comprising a throttle mounted on said aircraft for controlling the supply of power thereto, a Venturi tube installed on the aircraft in a position clear of propeller wash and airflow interference for converting the velocity of the airflow therethrough produced by the speed of said aircraft into a pressure head proportional to said velocity, at least one pressure responsive bellows in tubular connection with the throat of said Venturi tube, thereby subject to the pressure head developed by said Venturi tube and adapted to linearly extend and contract with the fluctuations in said pressure head, a coiled spring connected between said throttle and the movable structural head of said bellows for exerting a predetermined tension on said bellows head, an electric servo-motor connected to said power throttle for traversing in advance and return said throttle through a predetermined range of movement, a power supply for said servo-motor, a first electric circuit between said power supply and servo-motor including a switch actuated by said bellows for automatic direction and limit control of said servo-motor, a second electric circuit between said power supply and servo-motor by-passing said bellows actuated switch for manual control of said servo-motor, and switch means for selecting at will one only of said first and second circuits.

WINFIELD G. MAURER.
DAVID V. M. GREEN.

References Cited in the file of this patent

UNITED STATES PATENTS

| Number | Name | Date |
|---|---|---|
| 1,418,131 | Curtiss | May 30, 1922 |
| 1,978,863 | Gregg | Oct. 30, 1934 |
| 2,160,194 | Bates | May 30, 1939 |
| 2,342,184 | Fawcett | Feb. 22, 1944 |
| 2,391,896 | Hanson | Jan. 1, 1946 |